United States Patent Office 3,492,273
Patented Jan. 27, 1970

3,492,273
REGULAR SEQUENTIAL COPOLYESTERS
Richard Keith Quisenberry, Kinston, N.C., assignor to E. I. du Pont de Nemours and Company, Wilmington, Del., a corporation of Delaware
No Drawing. Filed Mar. 4, 1966, Ser. No. 531,740
Int. Cl. C08g 17/08
U.S. Cl. 260—75        1 Claim

ABSTRACT OF THE DISCLOSURE

A fiber-forming linear copolyester having a regular sequential molecular structure of recurring units represented by the formula

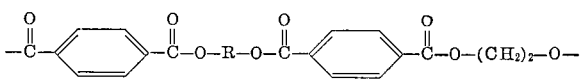

wherein R is a divalent radical from the group consisting of

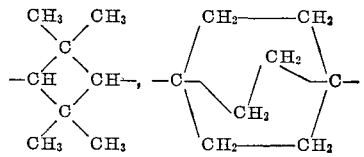

and

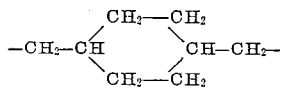

Also disclosed is a process for producing the above-defined copolyesters.

---

This invention relates to linear polyesters and, more particularly, to linear copolyesters having a regular sequential molecular structure.

Methods of preparation and useful properties of polyesters prepared from glycols and dicarboxylic acids are well known. For example, fibers and films prepared from polyethylene terephthalate, as described in Whinfield et al. U.S. Patent No. 2,465,319, dated Mar. 22, 1949, have become standard articles of commerce. It is also known that major changes in polymer properties may be obtained by preparing the polyester from a mixture of two different acids or from a mixture of two different glycols. However, when copolyesters of this type are prepared by usual methods, random copolymers result which have sharply reduced melting points and are difficult to crystallize.

The present invention provides a novel class of copolyesters prepared from a dicarboxylic acid and two different glycols wherein the molecular structure consists of regular sequential units of the following type:

[-acid-glycol₁-acid-glycol₂-]

These polymers are considerably easier to crystallize and have a much higher melting point than the corresponding random copolymers.

The novel copolyesters of the invention are derived from an aromatic dicarboxylic acid, in which at least 3-ring carbon atoms separate the carboxyl groups, and two different glycols, of which one of the glycols is characterized by a high degree of steric hindrance in that part of the molecule adjacent to the hydroxyl group, e.g., is the sterically hindered diol of a saturated alicyclic hydrocarbon. The second glycol is a member of the class $HO(CH_2)_xOH$ where $x$ is 2–10.

In a preferred embodiment of the invention the copolyester is prepared from terephthalic acid, ethylene glycol and a sterically hindered alicyclic diol, and may be represented as comprising regularly recurring units of the formula

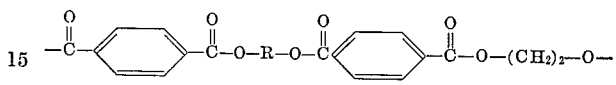

wherein R is a divalent radical from the group consisting of

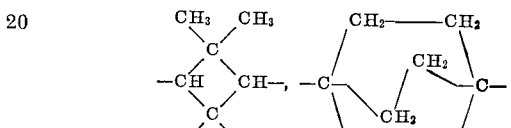

and

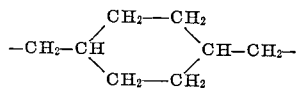

The radicals R are derived from 2,2,4,4-tetramethylcyclobutanediol, 1,4-bicyclo-[2,2,2]-octanediol, and hexahydro-p-xylylene glycol. Usually it is preferred that the linear copolyester have an intrinsic viscosity of at least 0.30, as measured in solution at 25° C. in mixture of 3 parts trifluoroacetic acid and one part methylene chloride by weight.

The copolyesters of the invention may be prepared by first forming the bis(ester)-ester having the structure

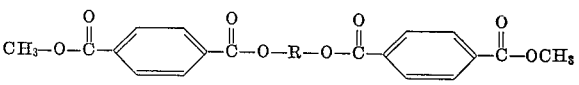

from a sterically hindered glycol, HO—R—OH, wherein R is a divalent saturated alicyclic hydrocarbon. This bis(ester)-ester is then condensed with the second glycol in a conventional ester interchange-melt polymerization procedure. Surprisingly, catalytic and reaction conditions which affected ester interchange of non-hindered glycols of the class $HO(CH_2)_nOH$, where $n$ is 2–10, do not influence the ester linkage adjacent to the sterically hindered glycol residue in the bis(ester)-ester. Consequently, the copolymer produced contains the two different glycol units in a 1:1 ratio and in regular alternating sequence. This reaction may be illustrated as follows:

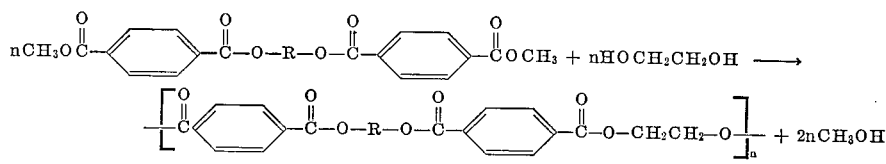

wherein $n$ is a large integer.

The above reaction is usually carried out in the presence of a catalyst. Suitable catalysts include manganous acetate and antimony oxide, tetraalkyltitanates, calcium acetate and lead oxide.

The bis(ester)-ester of the sterically hindered glycol used in the above reaction may be prepared by reacting 1 mol of the sterically hindered glycol with 2 mols of the half-ester, half-acid-chloride of terephthalic acid, i.e., 4-carbomethoxybenzoyl chloride.

Two of the diols used to prepare the copolyesters of the invention, tetramethylcyclobutanediol and hexahydro-p-xylylene glycol, are known to exist in stereoisomeric forms of the cis and trans variety. For high melting polymers it is preferred to use the trans isomer. Conversely, for lower melting polymers it is preferred to use the cis isomer.

The novel copolyesters of this invention are well suited to a variety of applications. They can be readily melt spun into filaments or cast from solutions to form self-supporting films. Their properties make them particularly advantageous for use in fibers for conversion to textiles, films, tapes and other shaped articles obtained by using the polymers as molding compositions.

The expression "polymer melt temperature" employed with respect to the products of this invention is the minimum temperature at which a sample of the polymer leaves a wet molten trail as it is stroked with moderate pressure across a smooth surface of a heated metal bar. "Polymer melt temperature" has sometimes in the past been referred to as "polymer stick temperature".

The term "intrinsic viscosity," as used herein, is defined as the limit of the fraction $ln(r)/c$ as $c$ approaches 0, where $(r)$ is the relative viscosity, and $c$ is the concentration in grams per 100 ml. of solution. The relative viscosity $(r)$ is the ratio of the viscosity of a solution of the polymer, in a mixture of 3 parts trifluoroacetic acid and 1 part methylene chloride by weight, to the viscosity of the trifluoroacetic acid/methylene chloride mixture, per se, measured in the same units at 25° C. Intrinsic viscosity is a measure of the degree of polymerization.

This invention is further illustrated, but is not intended to be limited, by the following examples.

EXAMPLE I

A polymer tube is charged with 4.5 g. ($9.65 \times 10^{-3}$ mol) 1,3 - bis(4 - carbomethoxybenzoxy) - 2,2,4,4-tetramethyl-cyclo-butane, 2.22 g. ethylene glycol, 0.002 g. (dissolved in 1.0 ml. ethylene glycol) $Sb_2O_3$, and 0.003 g. (dissolved in 1.5 ml. ethylene glycol) manganous acetate tetrahydrate. The tube is heated at 190–210° C. for 90 minutes. Then the tube is connected to a vacuum pump and the pressure reduced to 0.8 mm. Hg while the tube is heated at 270° C. for 3.75 hours. Upon cooling a crystalline polymer is obtained having a PMT of 160° C. and an intrinsic viscosity of 0.45. Drawable fibers can be pulled from the melt. Self-supporting films can be melt pressed from the polymer.

By degradation of the polymer and analysis of the products, it is established that the two glycols, ethylene glycol and tetramethylcyclobutane glycol, are present in the terephthalate polyester in a 1:1 mol ratio.

EXAMPLE II

Into a polymer tube are placed 2.0 g. ($4.3 \times 10^{-3}$ mol) of bis(4 - carbomethoxybenzoxy)-bicyclo-[2,2,2]-octane, 2.2 g. (2.0 mol.) ethylene glycol, 0.001 g. $Sb_2O_3$ (dissolved in 0.5 ml. ethylene glycol) and 0.0015 g. manganous acetate tetrahydrate (dissolved in 0.75 ml. ethylene glycol). The tube is heated at 190–210° C. for 120 minutes. Then the tube is connected to a vacuum pump and the pressure reduced to 0.8 mm. Hg while the tube is heated at 260° C. for 3.1 hours. Upon cooling a crystalline polymer is obtained having a PMT of 194° C. and an intrinsic viscosity of 0.3. Drawable fibers can be pulled from the melt and self-supporting films obtained by melt pressing.

By degradation of the polymer and analysis of the products it is established that the two glycols, bicyclo-[2,2,2]-octanediol and ethylene glycol, are present in the terephthalate polyester in a 1:1 mol ratio.

EXAMPLE III

Into a polymer tube are placed 4.18 g. ($10^{-2}$ mol) of bis (4 - carbomethoxybenzoxy)-1,4-dimethylenecyclohexane, 1.8 g. ($3 \times 10^{-2}$ mol) of ethylene glycol, 0.001 g. $Sb_2O_3$ (dissolved in 0.5 ml. ethylene glycol) and 0.0015 g. manganous acetate tetrahydrate (dissolved in 0.75 ml. ethylene glycol). The tube is heated at 190°–210° C. for 90 minutes in a nitrogen atmosphere. The reaction tube is connected to a vacuum pump and the pressure reduced to 0.8 mm. Hg while the tube is heated to 305° for another 4 hours. Upon cooling, a crystalline polymer is obtained having a PMT of 295° and an intrinsic viscosity of 0.5. By degradation of the polymer and analysis of the products, it is established that the two glycols, ethylene glycol and cyclohexanedimethanol, are present in the copolyester in a 1:1 mol ratio.

The bis(ester)-esters used in the examples may be prepared as follows:

(A) Preparation of 1,3-bis(4-carbomethoxy-benzoxy-2,2,4,4,-tetramethlycyclobutane Into a 500 ml. flask fitted with a heating mantle, stirrer, reflux condensor, and addition funnel is placed 200 ml. dry toluene and 19.8 g. (0.10 mol) p-carbomethoxybenzo-chloride. The solution is stirred at reflux, and to it is added dropwise 7.2 g. (0.05 mol) trans-2,2,4,4-tetramethyl-1,3-cyclobutanediol dissolved in 35 ml. anhydrous pyridine. A white solid separates as the pyridine solution is added. The reaction is stirred at reflux for 12 hours after addition is complete. The solid product is collected and recrystallized from toluene and found to have a melting point of 225–227° C.

*Analysis.*—Calculated for $C_{26}H_{28}O_8$: C, 66.6%; H, 6.02%. Found: C, 67.1%; H, 5.93%.

(B) Preparation of 1,4-bis(carbomethoxy-benzoxy)-bicyclo-[2,2,2]-octane

Into a 250 ml. flask equipped with a stirrer are placed 60 ml. anhydrous pyridine, 4.1 g. (0.029 mol) bicyclo-[2,2,2]-octanediol, and 11.5 g. (0.058 mol) p-carbomethoxybenzoylchloride. After stirring for 15 minutes at room temperature a white solid material separates. Stirring is continued for 45 minutes and then the reaction mixture is poured over 1 liter of ice and water. After drying and recrystallizing from toluene, the solid product is found to have a melting point of 236–238° C.

*Analysis.*—Calculated for $C_{26}G_{28}O_8$: C, 66.7%; H, 6.02%. Found: C, 67.5%; H, 5.9%.

(C) Preparation of 1,4-bis(4-carbomethoxy-benzoxy)-hexahydro-p-xylylene

Into a 2-liter flask equipped with a stirrer and heater is placed 30 g. (0.15 mol) p-carbomethoxybenzoyl chloride dissolved in 500 ml. n-hexane. To this solution is added over a period of 30 min. a solution of 10.65 g. (0.075 mol) cyclohexanedimethanol-1,4 in 100 ml. dry pyridine. After the addition is completed, the reaction mixture is stirred at reflux for 1 hour. Upon cooling, a white solid separates and is removed by filtration. Recrystallization from toluene gives a solid product which melts at 194° C.

Although the invention has been illustrated with copolyesters prepared from certain specific hindered glycols, it will be recognized by those skilled in the art that the principles of the invention apply equally well to other hindered glycols. Other suitable glycols include all those which have a hydroxymethyl group adjacent to a cycloaliphatic residue. Particularly to be mentioned are the two-ring cycloaliphatic glycols such as bis(4-hydroxymethylcyclohexyl), bis(4 - hydroxymethylcyclohexyl) methane, bis(4-hydroxymethylcclohexyl)ethane, and 2,2-bis(4-hydroxymethylcyclohexyl)propane. Other suitable glycols of this type, and methods for their preparation, are disclosed in British Patent No. 979,401, published Jan. 1, 1965.

Since many different embodiments of the invention may be made without departing from the spirit and scope thereof, it is to be understood that the invention is not limited by the specific illustrations except to the extent defined in the following claim.

I claim:
1. A fiber-forming linear copolyester, having an intrinsic viscosity of at least 0.3 as measured to the nearest 0.1 in solution at 25 °C. in a mixture of 3 parts trifluoroacetic acid and 1 part methylene chloride by weight, and the structural units of the copolyester consisting of recurring units represented by the formula

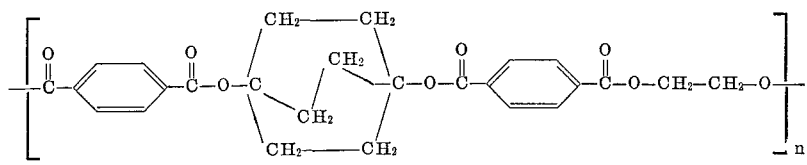

wherein $n$ is a large integer.

References Cited

UNITED STATES PATENTS

| | | | |
|---|---|---|---|
| 3,313,777 | 4/1967 | Elam et al. | 260—75 |
| 3,249,652 | 3/1966 | Quisenberry | 260—75 |
| 3,255,254 | 6/1966 | Kauer | 260—75 |
| 2,901,466 | 8/1959 | Kipler | 260—75 |

WILLIAM H. SHORT, Primary Examiner

L. P. QUAST, Assistant Examiner

U.S. Cl. X.R.

260—312, 338